US012644526B2

(12) United States Patent
Zhang

(10) Patent No.: US 12,644,526 B2
(45) Date of Patent: Jun. 2, 2026

(54) MULTIFUNCTIONAL SOFTENING VALVE

(71) Applicant: Zhengzhou Kangrun Fluid Equipment Co. LTD, Zhengzhou (CN)

(72) Inventor: Kefeng Zhang, Zhengzhou (CN)

( * ) Notice: Subject to any disclaimer, the term of this patent is extended or adjusted under 35 U.S.C. 154(b) by 454 days.

(21) Appl. No.: 18/504,957

(22) Filed: Nov. 8, 2023

(65) Prior Publication Data

US 2024/0200670 A1 Jun. 20, 2024

(30) Foreign Application Priority Data

Dec. 15, 2022 (CN) .......................... 202211611750.3

(51) Int. Cl.
*F16K 11/074* (2006.01)
*C02F 1/42* (2023.01)
*C02F 5/00* (2023.01)
(52) U.S. Cl.
CPC .............. *F16K 11/074* (2013.01); *C02F 1/42* (2013.01); *C02F 5/00* (2013.01); *C02F 2201/005* (2013.01); *C02F 2303/16* (2013.01)
(58) Field of Classification Search
CPC .. F16K 11/074; C02F 5/00; C02F 1/42; C02F 2201/005; C02F 2303/16
See application file for complete search history.

(56) References Cited

FOREIGN PATENT DOCUMENTS

| | | | | | |
|---|---|---|---|---|---|
| CN | 114811106 A | * | 7/2022 | ........... | F16K 27/045 |
| CN | 217301716 U | * | 8/2022 | | |
| CN | 115183011 A | * | 10/2022 | ............... | F16K 3/08 |
| CN | 115183023 A | * | 10/2022 | ............ | F16K 3/314 |
| CN | 217708958 U | * | 11/2022 | | |
| CN | 115711308 A | | 2/2023 | | |
| CN | 218845191 U | | 4/2023 | | |
| CN | 218954102 U | | 5/2023 | | |

OTHER PUBLICATIONS

CN-114811106-A Machine Translation (Year: 2022).*
CN-115183011-A Machine Translation (Year: 2022).*
CN-115183023-A Machine Translation (Year: 2022).*
CN-217301716-U Machine Translation (Year: 2022).*
CN-217708958-U Machine Translation (Year: 2022).*

* cited by examiner

*Primary Examiner* — Benjamin L Lebron
*Assistant Examiner* — Mahmoud Motaz Abdel Latif

(57) ABSTRACT

The disclosure provides a multifunctional softening valve. The valve includes a valve body, a movable valve plate, a fixed valve plate and a driving device. Wherein the valve body defines a water inlet, a water outlet, a drainage port, a water passing port, and a regenerant inlet. The valve body includes an inner chamber and an outer chamber. The inner chamber includes a central drainage cavity, a working cavity, a backwashing cavity, a regeneration cavity, a blind cavity, a forward washing cavity and a water injection cavity, and a water blocking structure is disposed at the backwashing cavity or the water outlet. The fixed valve plate and the movable valve plate cooperate to achieve the functions of water producing, backwashing, regeneration, forward washing and water injection, so that the structure of the softening valve is more excellent, and the performance is more excellent.

9 Claims, 12 Drawing Sheets

MULTIFUNCTIONAL SOFTENING VALVE

CROSS-REFERENCE TO RELATED APPLICATIONS

This application claims priority to Chinese Patent Application No. 202211611750.3, filed on Dec. 15, 2022, the entire disclosures of which are incorporated herein by reference.

TECHNICAL FIELD

The present disclosure relates to the technical field of water processing softening valves, and in particular, to a multifunctional softening valve.

BACKGROUND OF THE PRESENT INVENTION

Multifunctional control valves are often used in existing industrial or civil water processing system, particularly in the field of softening water processing, multifunctional softening valves are widely used to switch a water flow, thereby achieving the functions of water producing, backwashing, salt absorption/slow washing, water replenishing to a salt tank, forward washing, and so on.

In order to implement the above-mentioned functions in one valve body, various cavities or flow guiding holes need to be provided in the valve body and the valve plate, and various functions are implemented by changing the flow path of water. In this way, the influence of various structures on the valve body and the valve plate limits the water inlet amount and the water outlet amount under the normal water producing function. On the premise that the above functions are met, in order to increase the water inlet amount and outlet amount, it is a common practice to manufacture a larger-size softening valve, which not only increases the production and manufacturing costs, but also does not facilitate the installation and transportation of the softening valve.

Accordingly, there is a need in the art for a multifunctional softening valve to solve the above problems, but also make the structure more excellent and have stronger performance.

SUMMARY OF PRESENT INVENTION

The invention provides a multifunctional softening valve to achieve the five functions: running water, backwashing, regenerating, washing and supplementing water to the salt box, by a reasonable design of the inner structure of valve body and the valve plate. So that the technical problems is solved which in the prior art, a valve body with a larger specification needs to be manufactured for meeting the water outlet flow requirement of the softening valve, and then the problem, that manufacturing cost of the valve body is increased, are solved. The structure is more excellent, and the performance is improved.

The technical scheme of the presented invention is implemented in this way. The multifunctional softening valve includes a valve body, a movable valve plate and a driving device. Wherein a water inlet, a water outlet, a water outfall, a water passing port, and a regenerant inlet are formed in the side wall of the valve body.

An inner chamber and an outer chamber are located in the valve body. The inner chamber and an outer chamber are coaxial and separated from each other. The outer chamber is communicated with the water inlet. The inner chamber includes a central drainage cavity and a working cavity, a backwashing cavity, a regeneration cavity, a blind cavity, a forward washing cavity and a water injection cavity which are arranged in a fan ring and distributed in the circumferential direction of the central drainage cavity. The central drainage cavity is communicated with the water outlet, and a water blocking structure is disposed at the backwashing cavity or the water outlet. The regeneration cavity is in communication with the water passing port, and the water passing port is in communication with the regenerant inlet. The water injection cavity is communicated with the regenerant inlet. A first filter element interface and a second filter element interface, coaxial with a central axis, are disposed on a bottom portion of the valve body. The working cavity and the forward washing cavity are respectively communicated with the first filter element interface, and the backwashing cavity is communicated with the second filter element interface.

An inner chamber and an outer chamber are located in the valve body. The inner chamber and an outer chamber are coaxial and separated from each other. The outer chamber is communicated with the water inlet. The inner chamber includes a central drainage cavity and a working cavity, a backwashing cavity, a regeneration cavity, a blind cavity, a forward washing cavity and a water injection cavity which are arranged in a fan ring and distributed in the circumferential direction of the central drainage cavity. The central drainage cavity is communicated with the water outlet, and a water blocking structure is disposed at the backwashing cavity or the water outlet. The regeneration cavity is in communication with the water passing port, and the water passing port is in communication with the regenerant inlet. The water injection cavity is communicated with the regenerant inlet. A first filter element interface and a second filter element interface, coaxial with a central axis, are disposed on a bottom portion of the valve body. The working cavity and the forward washing cavity are respectively communicated with the first filter element interface, and the backwashing cavity is communicated with the second filter element interface.

The movable valve plate is coaxially disposed above the inner chamber. The driving device is in transmission connection with the movable valve plate to drive the movable valve plate to rotate in the valve body. A central blind hole is defined in a central position of the movable valve plate. The movable valve plate defines a water inlet through hole, a first blind hole, a second blind hole, a third blind hole, a fourth blind hole, a fifth blind hole, a drainage blind hole, a sixth blind hole, a seventh blind hole and an eighth blind hole which are arranged in a fan ring and distributed in the circumferential direction of the central blind hole.

The central blind hole is in communication with the central drainage cavity, the drainage blind hole is in communication with the central blind hole. The central angle corresponding to the first blind hole is equal to the central angle corresponding to the water injection cavity. The central angle corresponding to the first blind hole plus the central angle corresponding to the second blind hole is equal to the central angle corresponding to the water inlet through hole, the central angle corresponding to the working cavity, and the central angle corresponding to the backwashing cavity respectively. A central angle corresponding to the third blind hole is equal to a central angle corresponding to the fifth blind hole, a central angle corresponding to the sixth blind hole, a central angle corresponding to the eighth blind hole, and a central angle corresponding to the water injection cavity. A central angle corresponding to the fourth blind hole is equal to a central angle corresponding to the seventh blind hole. The central angle corresponding to the third blind hole plus the central angle corresponding to the fourth blind hole is equal to a central angle corresponding to the regeneration cavity and is equal to a central angle corresponding to the positive washing cavity. A central angle corresponding to the drainage blind hole plus a central angle corresponding to the fifth blind hole is equal to a central angle corresponding to the blind cavity.

Benefit effect: the invention achieves running water, regeneration water supplement to the salt box and forward washing through the cooperation between the valve body and the movable valve plate, to upgrade the structure of softening valve, and to reduce the setting of fixed valve plate. The inner structure of inner valve plate is simplified and production cost is reduced, and it has more excellent performance of function, and it is more conducive to the promotion of use.

In the preferred technical scheme of the multifunctional softening valve, the water blocking structure is a separating beam disposed in the backwashing cavity. The backwash chamber is divided into a first separating cavity and a second separating cavity by the separating beam. The first separating cavity is in communication with the water outlet. The second partition cavity is in communication with the second filter element interface. A blind plate ring adapted to the first separating cavity is disposed at the water inlet through hole of the movable valve plate. A first spacer beam, adapted to a top portion of the separating beam, is disposed in the third blind hole, the fourth blind hole, the fifth blind hole, the drainage blind hole, the sixth blind hole, the seventh blind hole, and the eighth blind hole.

Benefit effect: the cooperation between the cavity and the blind plate ring and the first separating beam of the movable valve plat, controls whether the water outlet communicates with the first filter element interface. The structure is ingenious, and the operation is convenient.

In a preferred technical scheme of the multifunctional softening valve, the multifunctional softening valve includes a first fixed valve plate. The first fixed valve plate is coaxially fixed on a top end surface of the inner chamber. The movable valve plate is located above the first valve plate and is rotatably and hermetically fit with the first fixed valve plate. A center of the first fixed valve plate defines a first central through hole. The first through hole, the second through hole, the third through hole, the first blind plate, the fourth through hole, and the fifth through hole are defined in the first fixed valve plate and distributed in a circumferential direction of the first central through hole. The first blind plate comprises a protruding edge.

The first central through hole is in communication with the central drainage cavity. The first through hole is in communication with the working cavity and the first filter element interface. A second spacer beam is disposed in the second through hole and the second through hole is divided into a first through opening and a second opening by the second space beam. The first through opening is in communication with the first separating cavity and the water outlet. The second through hole is in communication with the second separating cavity and the second filter element interface. The third through hole is in communication with the regeneration cavity and the water passing port. The first blind plate and the blind cavity are correspondingly arranged up and down. The fourth through hole is in communication with the forward washing cavity and the first filter element interface; and the fifth through hole is in communication with the water injection cavity and the regenerant inlet.

Benefit effect: the fixed valve plate cooperates with the movable valve plate to change the flow path of water, and the situation, that the movable valve plate is directly matched with the inner cavity to cause abrasion of the end face of the inner cavity and is inconvenient to maintain and replace, is avoided.

In a preferred technical scheme of the multifunctional softening valve, the central angle corresponding to the working cavity is the same as a central angle corresponding to the first through hole. A horizontal cross-sectional area of the working cavity is the same as a horizontal cross-sectional area of the first through hole. A central angle corresponding to the first separating cavity, a central angle corresponding to the first through opening, and a central angle corresponding to the blind plate ring are the same. A central angle corresponding to the second separating cavity, a central angle corresponding to the second through opening, and a central angle corresponding to the water inlet through hole are the same. Horizontal cross-sectional areas of the second separating cavity, and the second through opening, and the water inlet through hole are the same. A central angle corresponding to the regeneration cavity is the same as a central angle corresponding to the third through hole, and a horizontal cross-sectional area of the regeneration cavity is the same as a horizontal cross-sectional area of the third through hole. The central angle corresponding to the blind cavity is the same as the central angle corresponding to the blind plate, and a horizontal cross-sectional area of the blind cavity is the same as a horizontal cross-sectional area of the blind plate. A central angle corresponding to the forward washing cavity is the same as a central angle corresponding to the fourth through hole, and a horizontal cross-sectional area of the forward washing cavity is the same as a horizontal cross-sectional area of the fourth through hole. A central angle corresponding to the water injection cavity is the same as a central angle corresponding to the fifth through hole, and a horizontal cross-sectional area of the water injection cavity is the same as a horizontal cross-sectional area of the fifth through hole.

Benefit effect: a plurality of through holes in the fixed valve plate and a plurality of cavities of the inner cavity are correspondingly matched up and down, so that water, passing through the fixed valve plate, can directly enter the cavities of the inner cavity in an equal amount. The flow path of water is reduced, and the water outlet efficiency is improved.

In a preferred technical scheme of the multifunctional softening valve, the water-blocking structure is a valve disposed at the water outlet; the multifunctional softening valve further includes a second fixed valve plate coaxially fixed on a top end surface of the inner chamber. The movable valve plate is located above the second fixed valve plate and is rotatably and hermetically fit with the second fixed valve plate. A center of the second fixed valve plate defines a second central through hole. The second fixed valve plate has a first water passing hole, a second water passing hole, a third water passing hole, a second blind plate, a fourth water passing hole and a fifth water passing hole, arranged in a fan ring and distributed in a circumferential direction of the second central through hole. The second blind plate includes a protruding edge. The second central through hole is in communication with the central drainage cavity. The first water passing hole is in communication with the working cavity and the first filter element interface. The second water passing hole is in communication with the backwashing cavity and the second filter element interface. The third water passing hole is in communication with the regeneration cavity and the water passing port. The second blind plate and the blind cavity are correspondingly arranged up and down. The fourth water passing hole is in communication with the forward washing cavity and the first filter element interface; and the fifth water passing hole is in communication with the water injection cavity and the regenerant inlet.

In preferred technical scheme of the multifunctional softening valve described above, the central angles and the horizontal cross-sectional areas of the working cavity and the first water through hole are the same with the ones of the water inlet through hole respectively. The central angle and horizontal cross-sectional area of the backwashing cavity are the same with the ones of second water through hole respectively. The central angle and horizontal cross-sectional area of the regeneration cavity are the same with the ones of the third water through hole respectively. The central angle and horizontal cross-sectional area of the blind cavity are the same with the ones of the second blind plate respectively. The central angle and horizontal cross-sectional area of the forward washing cavity are the same with the ones of the fourth water through hole respectively. The central angle and horizontal cross-sectional area of the water injection cavity are the same with the ones of the fifth water through hole respectively.

Benefit effect: the effective use area of the water inlet through hole and the first through hole in the fixed valve plate is the same, when the multifunctional softening valve operates normally, raw water, passing through the water inlet through hole, can enter the tank body from the first through hole of the fixed valve plate in an equivalent amount, and when the raw water is discharged after being filtered, the raw water does not need to pass through the fixed valve plate and can be directly discharged from the water outlet in the valve body, so that the flowing path of water is reduced, and the water outlet efficiency is improved.

In a preferred technical scheme of the multifunctional softening valve, the water outlet, the water passing port and the regenerant inlet defined in the same side wall of the valve body. The blind cavity is in communication with the water outlet, and the central drainage cavity is in communication with the blind cavity. The cavity wall of the water injection cavity defines a water injection port, and the water injection port is in communication with the regenerant inlet. The side wall of the valve body is connected to a water guiding plate; the water guiding plate has a water guiding cavity in communication with water passing port, a regenerant flow pipe in communication with the regenerant inlet, and a drainage pipe in communication with the water outlet.

Benefit effect: the water outlet, the water passing port and the regenerant inlet are defined in the same side wall of the valve body, so that the valve body is compact in structure, and it is beneficial for installation of the valve body.

In a preferred technical scheme of the multifunctional softening valve, the water guiding plate defines a first water guiding hole, in communication with the water passing port, and a second water guiding hole in communication with the regenerant inlet. A cover plate is disposed on the water guiding plate. The cover plate defines a water guiding groove and the first water guiding hole is communication with the second water guiding hole via the water guiding groove. The first water guiding hole, the water guiding groove, and the second water guiding hole form a water guide cavity in communication with the water port and the regenerant inlet. The regenerant flow pipe is in communication with the second water guiding hole, and a jet opening is defined in the second water guiding hole.

Benefit effect: in the regeneration process, raw water at the water passing port enters the second water guiding hole through the jet opening, and is mixed with the regenerant sucked by the regenerant flow pipe, and then enters the water injection cavity through the regeneration inlet, and finally overflow from the upper portion of the water injection cavity to enter the forward washing cavity and the working cavity. The water then enters the tank body connected with the softening valve from the first filter element interface, and is subjected to ion exchange regeneration with the ion exchange resin in the tank body. The jet opening enables the incoming raw water amount to be small and enables the pressure to be large, and enables the flow speed to be increased. It is beneficial that the regenerant can be sucked out to be fully mixed with raw water, and the mixed water can fully react in the tank body.

DESCRIPTION OF THE DRAWINGS

In order to more clearly illustrate the technical solutions of the embodiments of the present disclosure or the prior art, the accompanying drawings which need to be used in embodiments or prior art descriptions are briefly described below. In an obvious way, the accompanying drawings in the following description are merely some embodiments of the present invention. For ordinary technicians in this field who can obtain other drawings according to these drawings without creative labor.

DETAILED DESCRIPTION OF PREFERRED EMBODIMENTS

Figure 1:
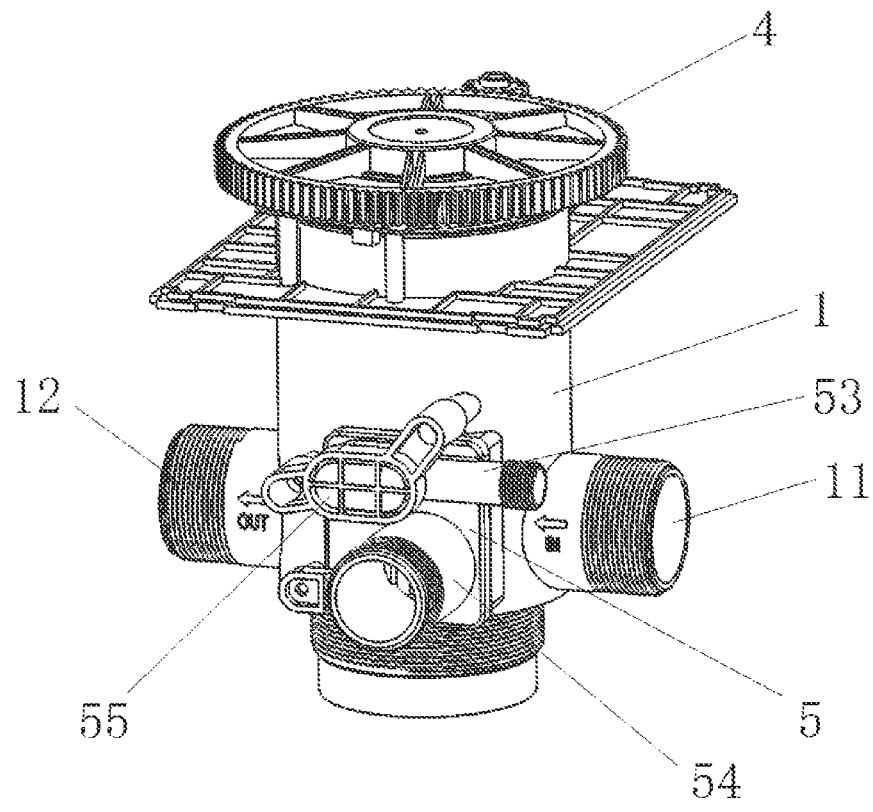
FIG. 1 is a schematic view of a first embodiment of a multifunctional softening valve of the present disclosure.

The technical solutions in the embodiments of the presented disclosure will be do a clearly and completely description with the accompanying drawings in the embodiments of the presented disclosure. Obviously, the described embodiments are only a part of the embodiments of the present invention, but are not all embodiments. Based on the embodiments of the presented invention, all other embodiments are developed and obtained by an ordinary person skilled in the art without any creative efforts, other embodiments obtained thereby are still covered by the present invention.

A First Embodiment of the Multifunctional Softening Valve of the Presented Disclosure As shown in FIG. 1 to FIG. 10, the multifunctional softening valve includes a valve body 1, a fixed valve plate 2 fixed in the valve body 1, a movable valve plate 3 rotatably mounted in the valve body 1, and a driving device 4 for driving the movable valve plate 3 to rotate. Wherein the movable valve plate 3 is rotatably and hermetically fit with the fixed valve plate 2. Both sides of the valve body 1, facing away from each other in the radial direction, define a water inlet 11 and a water outlet 12 respectively. The valve body 1 defines a water outlet 13, a water passing port 14, and a regenerant inlet 15 between the water inlet 11 and the water outlet 12.

The water outlet 13, the water passing port 14 and the regenerant inlet 15 are on the same side wall of the valve body 1. The side wall of the valve body 1 is connected to a water guiding plate 5. The water guiding plate 5 has a first water guiding hole 51 communicating with the water passing port 14, a second water guiding hole 52 communicating with the regenerant inlet 15, a regenerant flow pipe 53 communicating with the second water guiding hole 52, and a drainage pipe 54 communicating with the water outlet 13. A cover plate 55 is disposed on the water guiding plate 5. The cover plate 55 defines a water guiding groove. The water guide groove is in communication with the first water guiding hole 51 and the second water guiding hole 52. The first water guiding hole 51, the water guiding groove, and the second water guiding hole 52 form a water guiding cavity communicating with the water port 14 and the regenerant inlet 15. A jet opening 56 is defined in the second water guiding hole 52. The driving device 4 is a common gear shift fork driving structure in the related art, and details are not described in detail herein.

Figure 2:
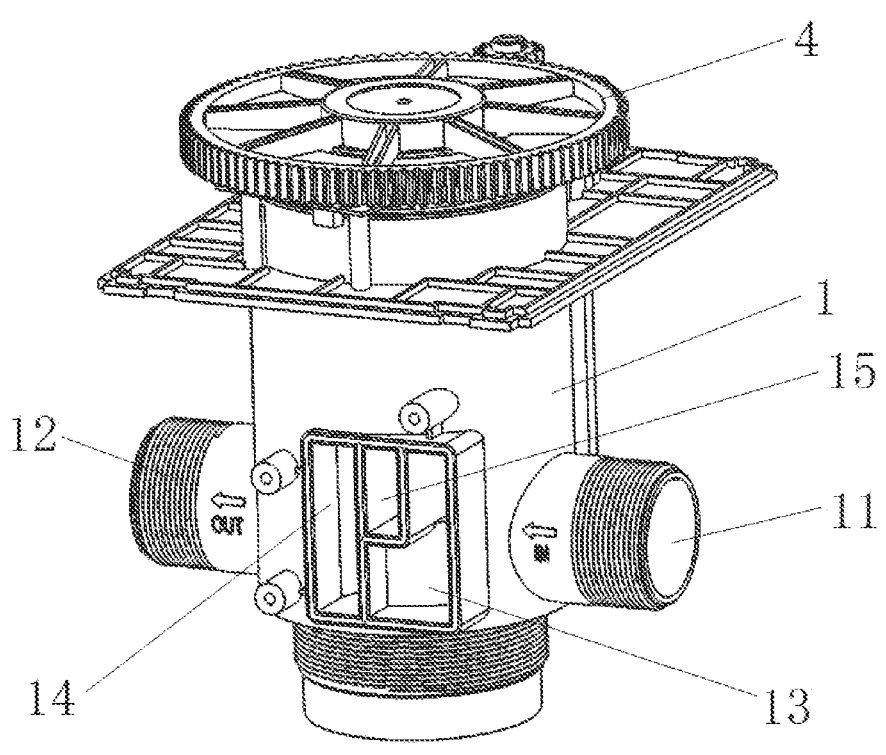
FIG. 2 is a schematic view of the side wall of the valve body of the first embodiment of the multifunctional softening valve of the present disclosure.
Figure 3:
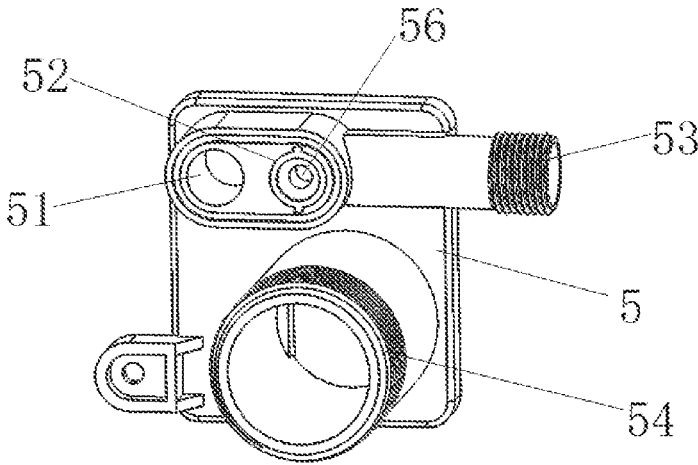
FIG. 3 is a schematic cross-sectional view of the water guiding plate of the first embodiment of the multifunctional softening valve of the present disclosure.
Figure 4:
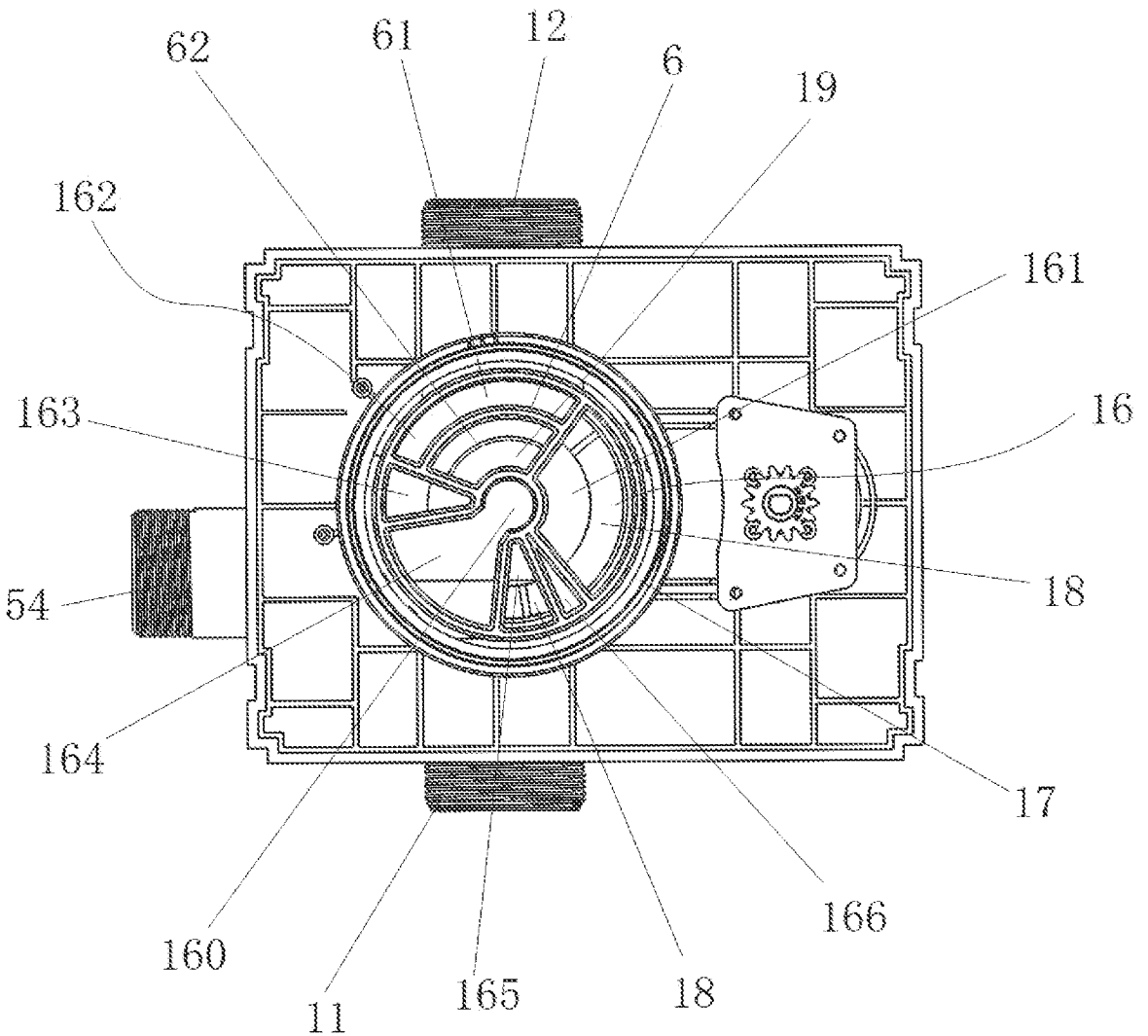
FIG. 4 is a top view of the internal structure of the valve body of the first embodiment of the multifunctional softening valve of the present disclosure.
Figure 5:
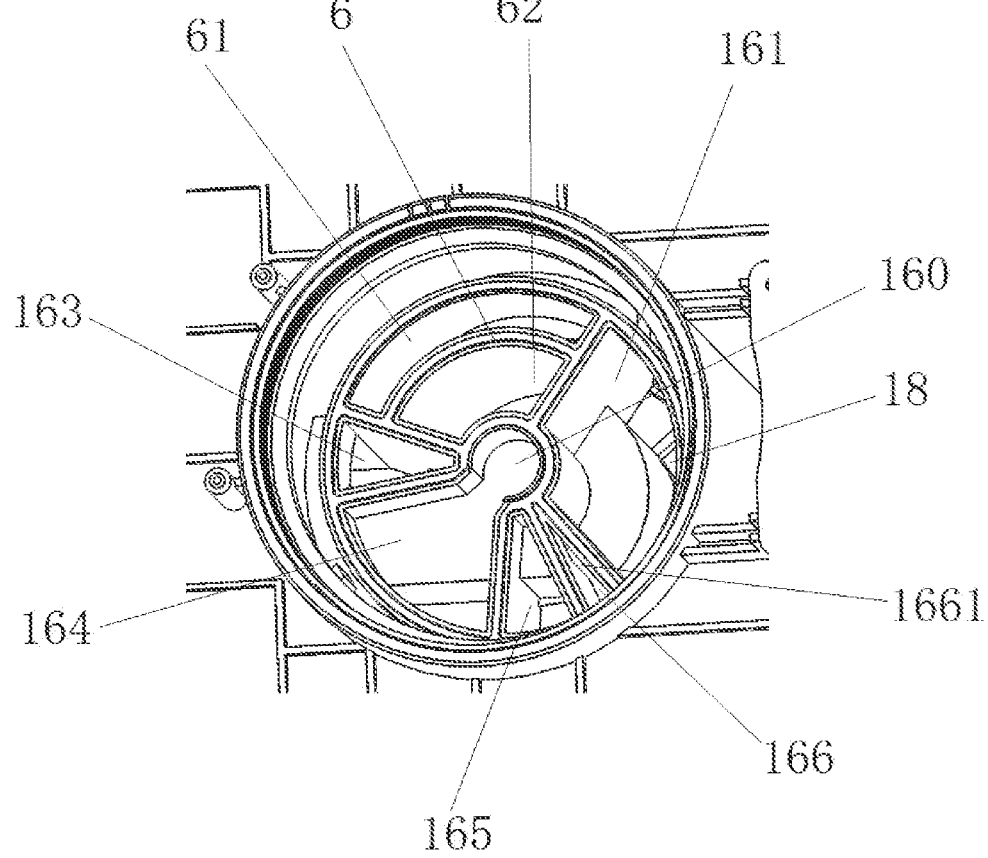
FIG. 5 is a schematic view of the internal structure of the valve body of the first embodiment of the multifunctional softening valve of the present disclosure.

As shown in FIG. 2, FIG. 4 and FIG. 5, in the valve body 1, an inner chamber 16 and an outer chamber 17 are coaxially arranged and separated. Wherein the outer chamber 17 is communicated with the water inlet 11. The inner chamber 16 includes a central drainage cavity 160 and a working cavity 161, a backwashing cavity 162, a regeneration cavity 163, a blind cavity 164, a forward washing cavity 165 and a water injection cavity 166 which are arranged in a fan ring and sequentially distributed in the circumferential direction of the central drainage cavity 160. A separating beam 6 is disposed in the backwashing cavity 162, and the separating beam 6 divides the backwashing cavity 162 into a first separating cavity 61 and a second separating cavity 62. The first separating cavity 61 is communicated with the water outlet 12. The central drainage cavity 160 is communicated with the blind cavity 164. The blind cavity 164 is communicated with the water outlet 13. The regeneration cavity 163 is communicated with the water passing port 14. A cavity wall of the water injection cavity 166 defines a water injection port 1661. The water injection port 1661 extends through the inner portions of the forward washing cavity 165 and the blind cavity 164 to be in communication with the regenerant inlet 15.

Figure 6:
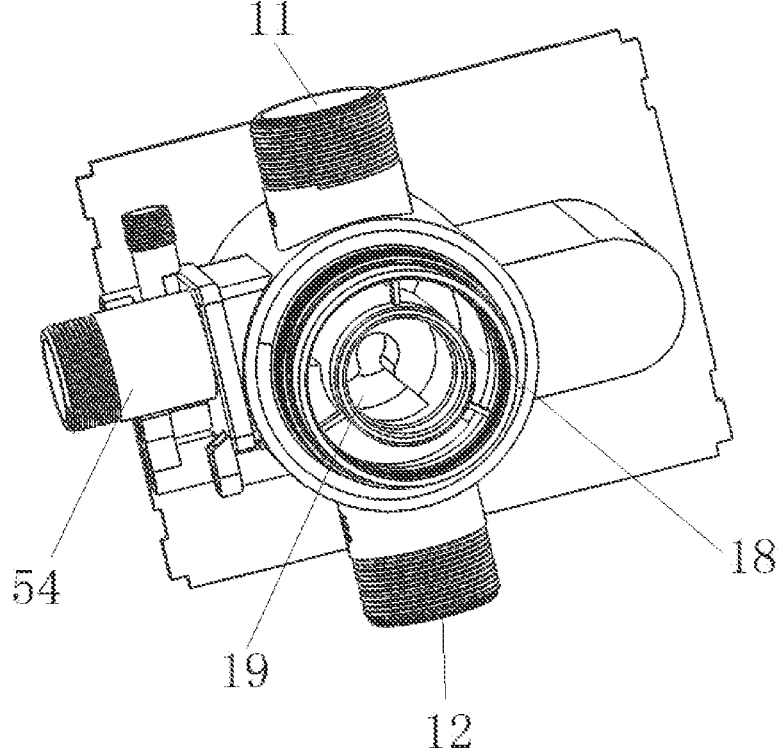
FIG. 6 is a schematic view of a bottom structure of the valve body of the first embodiment of the multifunctional softening valve of the present disclosure.

As shown in FIG. 4 and FIG. 6, a first filter element interface 18 and a second filter element interface 19 are defined in the bottom portion of the valve body 1. The second filter element interface 19 is located in the central position of the bottom portion of the valve body 1. The first filter element interface 18 is located on the outer side of the second filter element interface in the radial direction, and surrounds the second filter element interface 19 in a circumferential direction. The working cavity 161 and the forward washing cavity 165 are communicated with the first filter element interface 18, and the second separating cavity 62 is communicated with the second filter element interface 19.

Figure 7:
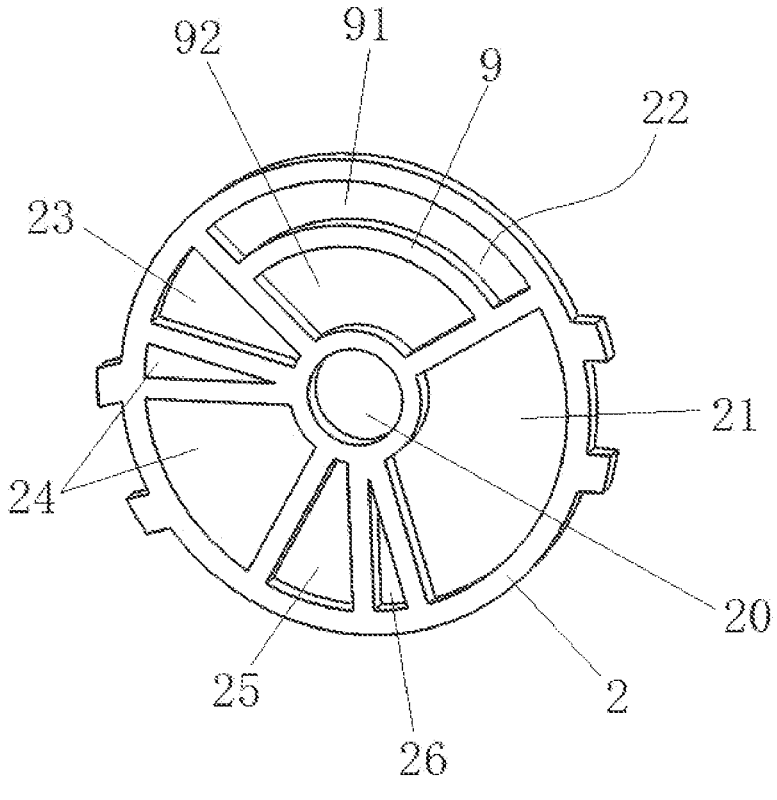
FIG. 7 is a schematic view of the fixed valve plate of the first embodiment of the multifunctional softening valve of the present disclosure.
Figure 9:
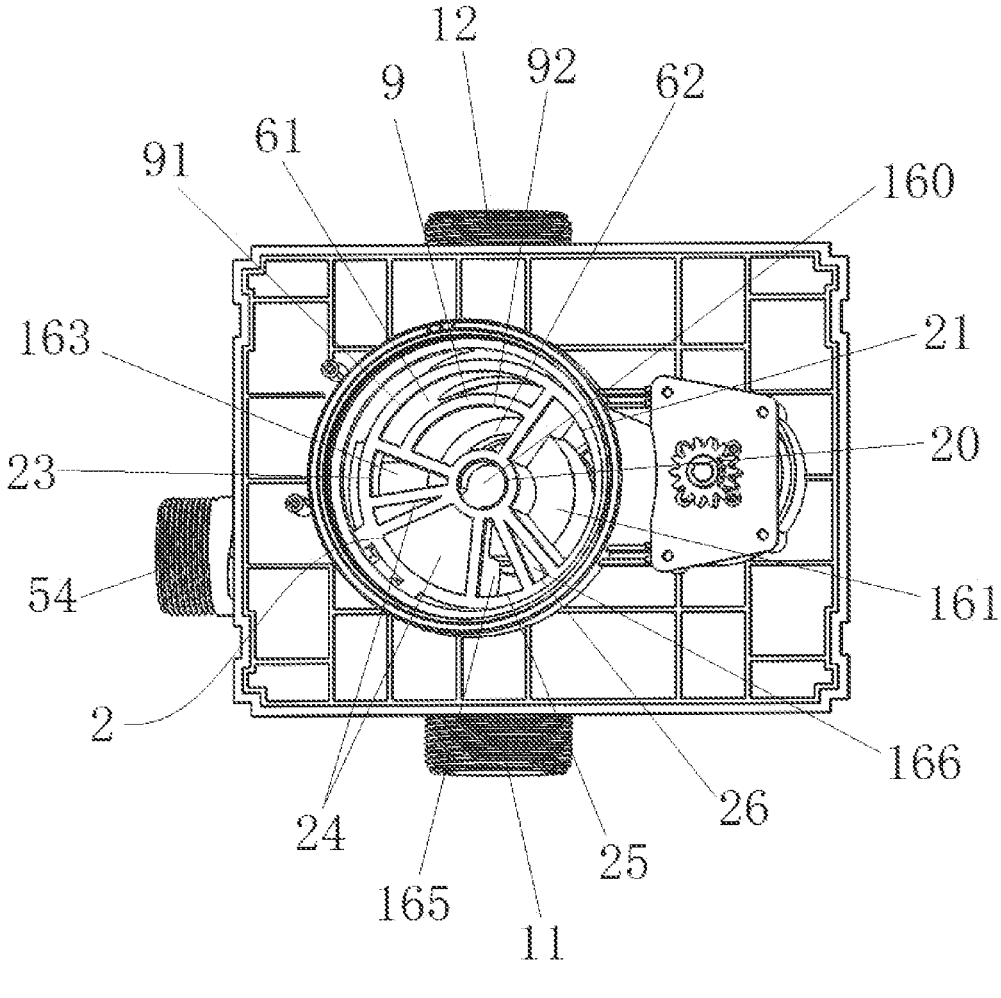
FIG. 9 is a schematic view of the fixed valve plate mounted in the valve body of the first embodiment of the multifunctional softening valve of the present disclosure.
Figure 10:
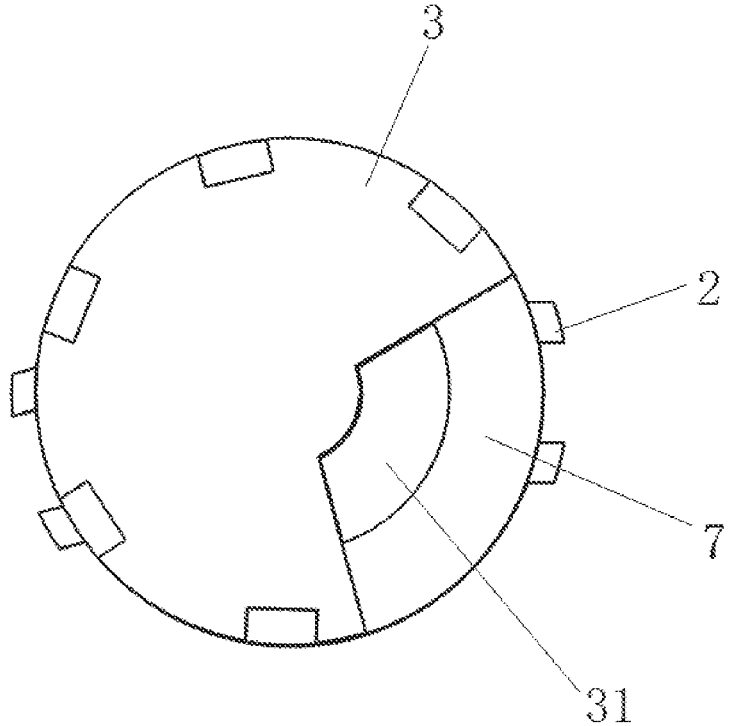
FIG. 10 is an assembled view of the fixed valve plate and the movable valve plate in the water producing mode of the first embodiment of the multifunctional softening valve of the present disclosure.
Figure 11:
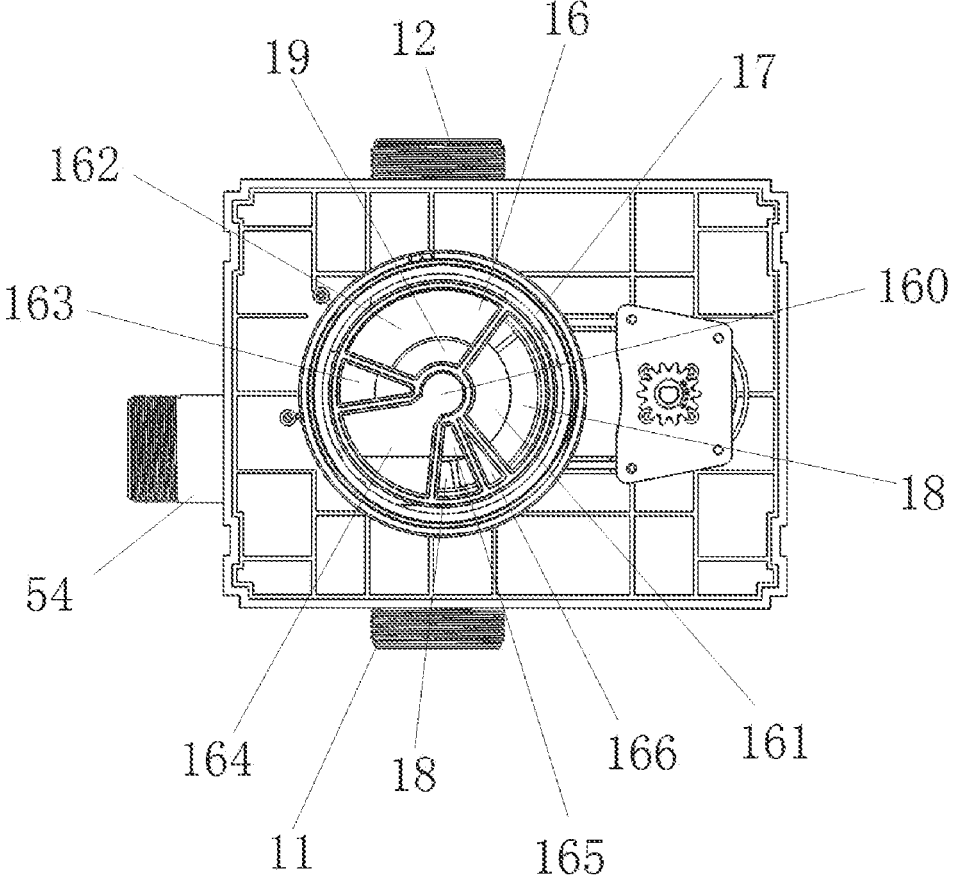
FIG. 11 is a schematic view of the internal structure of the valve body of a second embodiment of the multifunctional softening valve of the present disclosure.
Figure 12:
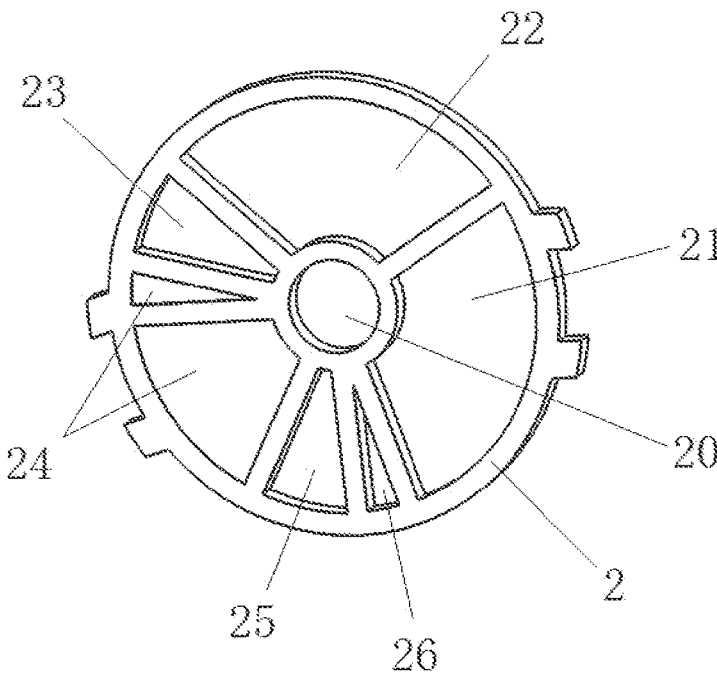
FIG. 12 is a schematic view of the fixed valve plate of the second embodiment of the multifunctional softening valve of the present disclosure.
Figure 13:
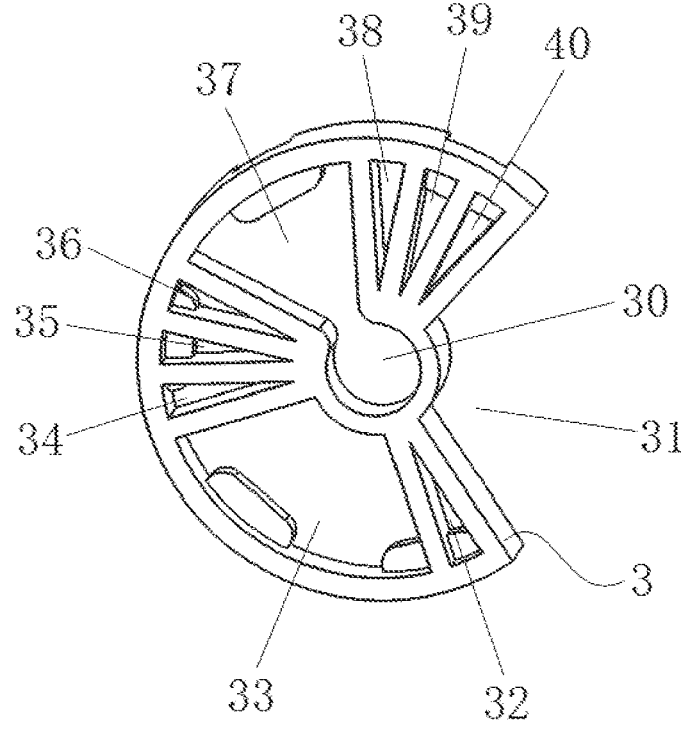
FIG. 13 is a schematic view of the movable valve plate of the first embodiment of the multifunctional softening valve of the present disclosure.
Figure 14:
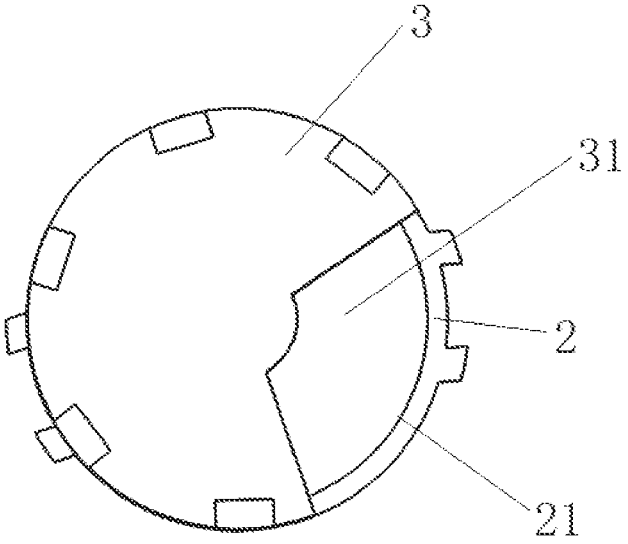
FIG. 14 is an assembled view of the fixed valve plate and the movable valve plate in the water producing mode of the second embodiment of the multifunctional softening valve of the present disclosure.

As shown in FIG. 7 and FIG. 9, the fixed valve plate 2 is secured to the valve body 1 by two pairs of supporting legs, and is located above the inner chamber 16. The horizontal cross-sectional area of the fixed valve plate 2, except the part of supporting legs, is equal to the one of inner chamber 16. The fixed valve plate 2 is stacked above the inner chamber 16, corresponds to the inner chamber 16 up and down, and is hermetically fit with the inner chamber 16. The center of the fixed valve plate 2 defines a central through hole 20. The fixed valve plate 2 has a first through hole 21, a second through hole 22, a third through hole 23, a first blind plate 24, a fourth through hole 25 and a fifth through hole 26 arranged in a fan ring and distributed in a circumferential direction of the central through hole 20. Wherein a second spacer beam 9 is disposed in the second through hole 22 adapted to the separating beam 6. The second through hole 22 is divided into the first through opening 91 and the second opening 92 by the second spacer beam 9. The central angle and the horizontal cross-sectional area of the first separating cavity 61 are the same with the ones of the first through opening 91 respectively. The central angle and the horizontal cross-sectional area of the second separating cavity 62 are the same with the ones of the second through opening 92 respectively.

The central angle and the horizontal cross-sectional area of the working cavity 161 are the same with the ones of the first through hole 21 respectively. The central angle and the horizontal cross-sectional area of the first separating cavity 61 are the same with the ones of the first through opening 91 respectively. The central angle and the horizontal cross-sectional area of the second separating cavity 62 are the same with the ones of the second through opening 92 respectively. The central angle and the horizontal cross-sectional area of the regeneration cavity 163 are the same with the ones of the third through hole 23 respectively. The central angle and the horizontal cross-sectional area of the blind cavity 164 are the same with ones of the blind plate 24 respectively. The central angle and the horizontal cross-sectional area of the forward washing cavity 165 are the same with the ones of the fourth through hole 25 respectively. The central angle and the horizontal cross-sectional area of the water injection chamber 166 are the same with the ones of the fifth through hole 26 respectively. The central angle and the horizontal cross-sectional area of working cavity 161 are the same with ones of the backwashing cavity 162 respectively. The central angle and the horizontal cross-sectional area of regeneration cavity 163 are the same with ones of the forward washing cavity 165 respectively.

As shown in FIG. 2, FIG. 4 and FIG. 9, the fixed valve plate is installed in the valve body 1, and the central through hole 20 is communicated with central drainage cavity 160. The first through hole 21 is communicated with working cavity 161 and the first filter element interface 18. The first through opening 91 is communicated with the first separating cavity 61 and the water outlet 12. The second through opening 92 is communicated with the second separating cavity 62 and the second filter element interface 19. The third through hole 23 is communicated with the regeneration cavity 163 and the water passing port 14. The blind plate 24 corresponds to the blind cavity 164. The fourth through hole 25 is communicated with the forward washing cavity 165 and the first filter element interface 18. The fifth through hole 26 is communicated with the water injection cavity 166 and the regenerant inlet 15.

Figure 8:
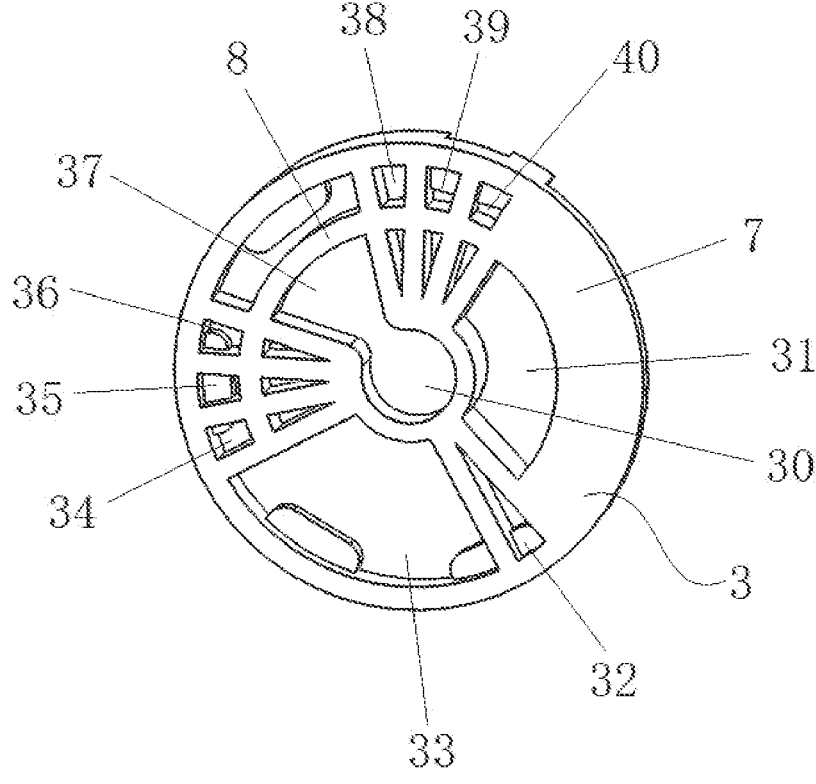
FIG. 8 is a schematic view of the movable valve plate of the first embodiment of the multifunctional softening valve of the present disclosure.

As shown in FIG. 8, a central blind hole 30 is defined in the center of the movable valve plate 3. The water inlet 31 and the first blind hole 32, the second blind hole 33, the third blind hole 34, the fourth blind hole 35, the fifth blind hole 36, the blind through hole 37, the sixth blind hole 38, the seventh blind hole 39 and the eighth blind hole 40 arranged in a fan ring and distributed in a circumferential direction of the central blind hole 30. Wherein a blind plate ring 7, adapted to the first separating cavity 61, is disposed at the water inlet through hole 31. The central angles of the first separating cavity 61 and the blind plate ring 7 are the same. The central angle and the horizontal cross-sectional area of the second separating cavity 62 are the same with the ones of the water inlet hole 31 respectively. A first spacer beam 8, adapted to the second spacer beam 9, are disposed in the third blind hole 34, the fourth blind hole 35, the fifth blind hole 36, the drainage blind hole 37, the sixth blind hole 38, the seventh blind hole 39, and the eighth blind hole 40. The drainage blind hole 35 is communicated with the central blind hole 30.

As shown in FIG. 7 and FIG. 8, the central angle corresponding to the first blind hole 32 is equal to the one of the fifth through hole 26. The central angle corresponding to the first blind hole 32 plus the central angle corresponding to the second blind hole 33 is equal to the central angle corresponding to the water inlet hole 31, is equal to the central angle corresponding to the first through hole 21, and is equal to the central angle corresponding to the second through hole 22. The central angle corresponding to the third blind hole 34 is equal to the central angle corresponding to the fifth blind hole 36, is equal to the central angle corresponding to the sixth blind hole 38, is equal to the central angle corresponding to the eighth blind hole 40, and is equal to the central angle corresponding to the fifth through hole 26. The central angle corresponding to the fourth blind hole 35 is equal to the central angle corresponding to the seventh blind hole 39. The central angle corresponding to the third blind hole 34 plus the central angle corresponding to the fourth blind hole 35 is equal to the central angle corresponding to the third through hole 23, and is equal to the central angle corresponding to the fourth through hole 25. The central angle corresponding to the drainage blind hole 37 plus the central angle corresponding to the fifth blind hole 36 is equal to the central angle corresponding to the blind plate 24. A side of the blind plate 24 facing towards the movable valve plate 3 includes a protruding edge. The blind plate 24 is divided into two parts by the protruding edge. Wherein the central angle corresponding to the part of the blind plate 24, closed to the fourth through hole 25, is equal to the central angle corresponding to the drainage blind hole 37. The central angle corresponding to the part of the blind plate 24, closed to the third through hole 23, is equal to the central angle corresponding to the fifth blind hole 36.

In this embodiment, the central angle corresponding to the working cavity 161 is 105° and is equal to the central angle corresponding to the backwashing cavity 162. The central angle corresponding to the regeneration cavity 163 is 30° and is equal to the central angle corresponding to the forward washing cavity 165, the central angle corresponding to the blind cavity is 75°, and the central angle corresponding to the water injection chamber is 15°.

The movable valve plate is mounted above the fixed valve plate 2, and the central blind hole 30 is communicated with the central drainage cavity 160 through the central through hole 20.

The modes of the multifunctional softening valve of the presented invention includes a water producing mode, a backwashing mode, a regeneration mode, a forward washing mode, and a salt tank water injection mode, and the driving device 4 drives the movable valve plate 3 to rotate to enable the movable valve plate 3 and the fixed valve plate 2 to cooperate to implement switching operation of different modes.

In the water producing mode, the water inlet through hole 31 of the movable valve plate 3 is correspondingly communicated with the first through hole 21 of the fixed valve plate 2. The first blind hole 32 and the second blind hole 33 correspond to the second through hole 22. The third blind hole 34 and the fourth blind hole 35 correspond to the third through hole 23. The fifth blind hole 36 and the blind drainage hole 37 correspond to the blind hole 24. The sixth blind hole 38 and the seventh blind hole 39 correspond to the fourth through hole 25. The eighth blind hole 40 corresponds to the fifth through hole 26. The raw water flows from the water inlet 11 into the outer chamber 17 of the valve body 1, passes through the water inlet hole 31, the first through hole 21, the working cavity 161, the first filter element interface 18 in sequence, and enters into the tank body connected with the valve body 1. The materials, such as ion exchange resin, used for softening the water are stored in the tank body. The softened water flows along with the central pipe, and passes through the second filter element interface 19, the second separating cavity 62, and the second through opening 92 to enter into the first blind hole 32 and the second blind hole 33 in sequence. The water was turned over the second spacer beam 9, and enters into the first separating cavity 61 by the first through opening 91, and finally flows out from the water outlet 12, thereby achieving water producing with a multifunctional softening valve.

In the backwashing mode, the driving device 4 drives the movable valve plate 3 to counterclockwise rotate by 105° (corresponding to the position of the movable valve plate 3 in the water producing mode), to enable the water inlet through hole 31 of the movable valve plate 3 to be correspondingly communicated with the second through opening 92 of the fixed valve plate 2. The blind plate ring 7 corresponds to the first through opening 91. The third blind hole 34 and the fourth blind hole correspond to the fourth through hole 25. The fifth blind hole 36 corresponds to the fifth through hole 26. The drainage blind hole 37, the sixth blind hole 38, the seventh blind hole 39, and the eighth blind hole 40 correspond to the first through hole 21.

The water flows into the outer chamber 17 of the valve body 1 from the water inlet 11, and flows through the water inlet hole 31, the second through opening 92, the second separating cavity 62, the second filter element interface 19 in sequence to enter into the central pipe of the tank body connected to the valve body 1. The water flushes the ion exchange resin in the tank body from bottom to top, and the backwashing wastewater enters into the working cavity 161 from the first filter element interface 18, and flows through the through hole 21, the blind hole 37, the central blind hole 31 and the central through hole 20 to enter into the central drainage cavity 160. Finally, backwashing wastewater flows through the drainage port 13 to enter into the drainage pipe 54 to be discharged, thereby achieving backwashing with the multifunctional softening valve.

The regenerant flow pipe 53 is connected with the salt tank. When in the regeneration mode, the driving device 4 drives the movable valve plate 3 to rotate by 210° (corresponding to the position of the movable valve plate 3 in the water producing mode), to enable the water inlet through hole 31 of the movable valve plate 3 to correspond to the third through hole 23 and the blind plate 24 on the fixed valve plate 2. The first blind hole 32 and the second blind hole 33 correspond to the fourth through hole 25, the firth through hole 26 and the part of the first through hole 21. The third blind hole 34, the fourth blind hole 35, and the fifth blind hole 36 correspond to the rest part of the first through hole 21. The drainage blind hole 37, the sixth blind hole 38, the seventh blind hole 39, and the eighth blind hole 40 correspond to the through hole 22. What's more, the first spacer beam 8 located in the drainage blind hole 37, the sixth blind hole 38, the seventh blind hole 39 and the first spacer beam 8 of the eighth blind hole 40 correspond to and are hermetically fit with the second spacer beam 9 in the second through hole 22. Water enters the outer chamber 17 of the valve body 1 from the water inlet 11, and sequentially passes through the water inlet through hole 31, the third through hole 23, the regeneration cavity 163, the water passing port 14, the first water guiding hole 51, the water guiding groove, the second water guiding hole 52, and is mixed with the regenerant water sucked from the regenerant flow pipe 53 at the second water guiding hole 52 by the effect of the jet opening 56. As an example, the regenerant water is salt water, and then enters the water injection chamber 166 through the regenerant inlet 15. The mixed water is turned into the fourth through hole 25 and the first through hole 21 through the fifth through hole 26 and the second blind hole 33, and enters the tank body connected with the valve body 1 through the first filter element interface 18. After the ion exchange reaction with the ion exchange resin in the tank body, the mixed water enters the second separating cavity 62 from the central pipe of the tank body through the second filter element interface 19, and enters the drainage blind hole 37 through the second through opening 92. The spacer beam 8 located in the drainage blind hole 37, the sixth blind hole 38, the seventh blind hole 39, and the eighth blind hole 40 block water from turning into the first through opening 91. Water sequentially enters the central blind hole 30, the central through hole 20, and the central drainage cavity 160. Finally, the water passes through the water outlet 13 to enter the drainage pipe 54 to be discharged, so as to achieve the regeneration process with the multifunctional softening valve.

In the forward washing mode, the driving device 4 drives the movable valve plate 3 to counterclockwise rotate by 240° (corresponding to the position of the movable valve plate 3 in the water producing mode), to enable the water inlet through hole 31 of the movable valve plate 3 to correspond to the fourth through hole 25 of the fixed valve plate 2 and the blind plate 24 up and down. The first blind hole 32 corresponds to the fifth through hole 26 up and down. The second blind hole 33 and the third blind hole 34 correspond to the first through hole 21. The fourth blind hole 35, the fifth blind hole 36, the drainage blind hole 37, and the sixth blind hole 38 correspond to the second through hole. Moreover, the first spacer beam 8 in the fourth blind hole 35, the fifth blind hole 36, the drainage blind hole 37, and the sixth blind hole 38 correspond to and are hermetically fit with the second spacer beam 9 at the second through hole 22. The seventh blind hole 39 and the eighth blind hole 40 correspond to the third through hole 23. Water enters into the outer chamber 17 of the valve body 1 from the water inlet 11 and passes through the water inlet through hole 31, the fourth through hole 25, the forward washing cavity 165 and the first filter element interface 18 to enter into the tank body connected with the valve body 1, and flows to the ion exchange resin from top to bottom for forward washing. Then water enters the second separating cavity 62 from the central pipe through the second filter element interface 19, and enters the drainage blind hole 37 through the second through opening 92. The spacer beam 8 in the fourth blind hole 35, the fifth blind hole 36, the drainage blind hole 37, and the sixth blind hole 38 block water from turning into the first through opening 91. Water finally enters into the central blind hole 30, the central through hole 20 and the central drainage cavity 160 in sequence through the drainage blind hole 37, and is finally discharged after entering the drainage pipe 54 through the water outlet 13, thereby achieving forward washing with the multifunctional softening valve.

When in the water injection mode, the driving device 4 drives the movable valve plate 3 to rotate by 255° (corresponding to the position of the movable valve plate 3 in the water producing mode), to enable the water inlet through hole 31 of the movable valve plate 3 to correspond to the part of the blind plate 24 of the fixed valve plate 2 close to the fourth through hole 25, the fourth through hole 25, and the fifth through hole 26. The first blind hole 32 and the second blind hole 33 correspond to the first through hole 21. The third blind hole 34, the fourth blind hole 35, the fifth blind hole 36 and the drainage blind hole 37 correspond to the second through hole 22. Moreover, the first spacer beam 8 in the third blind hole 34, the fourth blind hole 35, the fifth blind hole 36 and the drainage blind hole 37 correspond to the second spacer beam 9 at the second through hole 22. The sixth blind hole 38 and the seventh blind hole 39 correspond to the third through hole 23. The eighth blind hole 40 corresponds to a part of the blind plate 24 close to the third through hole 23. At this time, the water injection cavity 166 and the forward washing cavity 165 are both in communication with the water inlet through hole 31. Therefore, the forward washing mode is also operated while the water injection mode is performed. The operation process of the forward washing mode has been described above, and details are not described herein again, and only the operation process of the water injection mode is set forth. Water passes through the water inlet through hole 31, the fifth through hole 26, the water injection cavity 166, the regenerant inlet 15 and the regenerant flow pipe 53, to enter into the salt tank and water is injected according to needs.

A Second Embodiment of the Multifunctional Softening Valve of the Presented Disclosure As shown in FIGS. 11 to 14, the difference between the second embodiment and the first embodiment is that a valve is disposed at the water outlet 12. The inner chamber 16 of the valve body 1 includes a central drainage cavity 160, and a working cavity 161, a backwashing cavity 162, a regeneration cavity 163, a blind cavity 164, a forward washing cavity 165 and a water injection cavity 166, arranged in a fan ring and sequentially distributed in the circumferential direction of the central drainage cavity 160. There is no separating beam in the backwashing cavity 162, and the backwashing cavity 162 is directly communicated with the water outlet 12 and the second filter element interface 19.

The center of the fixed valve plate 2 defines a central through hole 20. The fixed valve plate 2 has a first through hole 21, a second through hole 22, a third through hole 23, a blind plate 24, a fourth through hole 25, and a fifth through hole 26, arranged in a fan ring and sequentially distributed in the circumferential direction of the central through hole 20. There is no separating beam in the second through hole 22, and the second through hole 22 is in communication with the backwashing cavity 162 and the second filter element interface 19. The central angles corresponding to the backwashing cavity 162 and the water passing hole 222 are the same, and the horizontal cross-sectional areas of the backwashing cavity 162 and the water passing hole 222 are the same.

The central position of the movable valve plate 3 defines a central blind hole 30. The movable valve plate 3 defines a water inlet through hole 31, a first blind hole 32, a second blind hole 33, a third blind hole 34, a fourth blind hole 35, a fifth blind hole 36, a drainage blind hole 37, a sixth blind hole 38, a seventh blind hole 39, and an eighth blind hole 40, arranged in a fan ring and sequentially distributed in the circumferential direction of the central blind hole 30. There is no blind plate ring in water inlet through hole 31. There is no spacer beam in the third blind hole 34, the fourth blind hole 35, the fifth blind hole 36, the drainage blind hole 37, the sixth blind hole 38, the seventh blind hole 39, and the eighth blind hole 40.

In the water producing mode, the valve connected at the water outlet 12 is opened, the water inlet through hole 31 of the movable valve plate 3 is correspondingly communicated with the first through hole 21 of the fixed valve plate 2. The first blind hole 32 and the second blind hole 33 correspond to the second through hole 22. The third blind hole 34 and the fourth blind hole 35 correspond to the third through hole 23. The fifth blind hole 36 and the blind drainage hole 37 correspond to the blind hole 24. The sixth blind hole 38 and the seventh blind hole 39 correspond to the fourth through hole 25. The eighth blind hole 40 corresponds to the fifth through hole 26. The raw water flows from the water inlet 11 into the outer chamber 17 of the valve body 1, passes through the water inlet hole 31, the first through hole 21, the working cavity 161, the first filter element interface 18 in sequence, and enters into the tank body connected with the valve body 1. The materials, such as ion exchange resin, used for softening the water are stored in the tank body. The softened water flows along with the central pipe, and passes through the second filter element interface 19, the backwashing cavity 62 in sequence, and finally flows out from the water outlet 12, thereby achieving water producing with a multifunctional softening valve.

In the backwashing mode, the valve connected at the water outlet 12 is closed. The driving device 4 drives the movable valve plate 3 to counterclockwise rotate by 105° (corresponding to the position of the movable valve plate 3 in the water producing mode), to enable the water inlet through hole 31 of the movable valve plate 3 to be correspondingly communicated with the second through hole 22 of the fixed valve plate 2. The first blind hole 32 and the second blind hole 33 correspond to the third through hole 23 and the blind plate 24. The third blind hole 34 and the fourth blind hole 35 correspond to the fourth through hole 25. The fifth blind hole 36 corresponds to the fifth through hole 26. The drainage blind hole 37, the sixth blind hole 38, the seventh blind hole 39, and the eighth blind hole 40 correspond to the first through hole 21. The water flows into the outer chamber 17 of the valve body 1 from the water inlet 11, and flows through the water inlet hole 31, the second through hole 22, the backwashing cavity 162, the second filter element interface 19 in sequence to enter into the central pipe of the tank body connected to the valve body 1. The water flushes the ion exchange resin in the tank body from bottom to top, and the backwashing wastewater enters into the working cavity 161 from the first filter element interface 18, and flows through the through hole 21, the blind hole 37, the central blind hole 30 and the central through hole 20 to enter into the central drainage cavity 160. Finally, backwashing wastewater flows through the drainage port 13 to enter into the drainage pipe 54 to be discharged, thereby achieving backwashing with the multifunctional softening valve.

The regenerant flow pipe 53 is connected with the salt tank. When in the regeneration mode, the valve connected at the water outlet 12 is closed. The driving device 4 drives the movable valve plate 3 to rotate by 210° (corresponding to the position of the movable valve plate 3 in the water producing mode), to enable the water inlet through hole 31 of the movable valve plate 3 to correspond to the third through hole 23 and the blind plate 24 on the fixed valve plate 2. The first blind hole 32 and the second blind hole 33 correspond to the fourth through hole 25, the firth through hole 26 and the part of the first through hole 21. The third blind hole 34, the fourth blind hole 35, and the fifth blind hole 36 correspond to the rest part of the first through hole 21. The drainage blind hole 37, the sixth blind hole 38, the seventh blind hole 39, and the eighth blind hole 40 correspond to the second through hole 22. Water enters the outer chamber 17 of the valve body 1 from the water inlet 11, and sequentially passes through the water inlet through hole 31, the third through hole 23, the regeneration cavity 163, the water passing port 14, the first water guiding hole 51, the water guiding groove, the second water guiding hole 52, and is mixed with the regenerant water sucked from the regenerant flow pipe 53 at the second water guiding hole 52 by the effect of the jet opening 56. Then the mixed water enters the water injection chamber 166 through the regenerant inlet 15. The mixed water is turned into the fourth through hole 25 and the first through hole 21 through the fifth through hole 26 and the second blind hole 33, and enters the tank body connected with the valve body 1 through the first filter element interface 18. After the ion exchange reaction with the ion exchange resin in the tank body, the mixed water enters the second separating cavity 62 from the central pipe of the tank body through the second filter element interface 19, and enters into the second through hole 22, the drainage blind hole 37, the central blind hole 30, the central through hole 20 to enter into the central drainage cavity 160. Finally, the water passes through the water outlet 13 to enter into the drainage pipe 54 to be discharged, so as to achieve the regeneration process with the multifunctional softening valve.

In the forward washing mode, the valve connected at the water outlet 12 is closed. The driving device 4 drives the movable valve plate 3 to counterclockwise rotate by 240° (corresponding to the position of the movable valve plate 3 in the water producing mode), to enable the water inlet through hole 31 of the movable valve plate 3 to correspond to the fourth through hole 25 of the fixed valve plate 2 and the blind plate 24 up and down. The first blind hole 32 corresponds to the fifth through hole 26 up and down. The second blind hole 33 and the third blind hole 34 correspond to the first through hole 21. The fourth blind hole 35, the fifth blind hole 36, the drainage blind hole 37, and the sixth blind hole 38 correspond to the second through hole 22. The seventh blind hole 39 and the eighth blind hole 40 correspond to the third through hole 23. Water enters into the outer chamber 17 of the valve body 1 from the water inlet 11 and passes through the water inlet through hole 31, the fourth through hole 25, the forward washing cavity 165 and the first filter element interface 18 to enter into the tank body connected with the valve body 1, and flows to the ion exchange resin from top to bottom for forward washing. Then water enters into the central pipe to enter the back washing cavity 162 through the second filter element interface 19, and enters the drainage blind hole 37 through the second through hole 22. Water finally enters into the central blind hole 30, the central through hole 20 and the central drainage cavity 160 in sequence through the drainage blind hole 37, and is finally discharged after entering the drainage pipe 54 through the water outlet 13, thereby achieving forward washing with the multifunctional softening valve.

When in the water injection mode, the valve connected at the water outlet 12 is closed. The driving device 4 drives the movable valve plate 3 to rotate by 255° (corresponding to the position of the movable valve plate 3 in the water producing mode), to enable the water inlet through hole 31 of the movable valve plate 3 to correspond to the part of the blind plate 24 of the fixed valve plate 2 close to the fourth through hole 25, the fourth through hole 25, and the fifth through hole 26. The first blind hole 32 and the second blind hole 33 correspond to the first through hole 21. The third blind hole 34, the fourth blind hole 35, the fifth blind hole 36 and the drainage blind hole 37 correspond to the second through hole 22. The sixth blind hole 38 and the seventh blind hole 39 correspond to the third through hole. The eighth blind hole 40 corresponds to a part of the blind plate 24 close to the third through hole 23. At this time, the water injection cavity 166 and the forward washing cavity 165 are both in communication with the water inlet through hole 31. Therefore, the forward washing mode is also operated while the water injection mode is performed. The operation process of the forward washing mode has been described above, and details are not described herein again, and only the operation process of the water injection mode is set forth. Water passes through the water inlet through hole 31, the fifth through hole 26, the water injection cavity 166, the regenerant inlet 15 and the regenerant flow pipe 53, to enter into the salt tank and water is injected according to needs.

It is noted that although the fixed valve plate are arranged in the valve bodies in the first embodiment and the second embodiment, this is not a limitation on the structure of the softening valve. For example, in other embodiments, the fixed valve plate may also be omitted, and the movable valve plate directly and rotatably cooperates with the inner chamber to implement the various functions described above.

It should also be noted that although the water passing port, the regenerant inlet and the drainage port in the first embodiment and the second embodiment are disposed on the same side wall of the valve body, this is not a limitation on the positions of the water passing port, the regenerant inlet, and the drainage port. For example, in other embodiments, the water passing port, the regenerant inlet and the drainage port may also be disposed on different side walls of the valve body.

It should also be noted that the central angle corresponding to the working cavity in the first embodiment and the second embodiment is equal to the central angle corresponding to the backwashing cavity, and is equal to 105°. The central angle corresponding to the regeneration chamber is equal to the central angle corresponding to the forward washing cavity and is equal to 30°. The central angle corresponding to the blind chamber is equal to 75°. The central angle corresponding to the water injection chamber is equal to 15°. However, this is not the only angle of the central angle corresponding to each cavity. For example, in other embodiments, the central angle corresponding to the working cavity is equal to the central angle corresponding to the backwashing chamber and is equal to 100°. The central angle corresponding to the regeneration cavity is equal to the central angle corresponding to the forward washing cavity and is equal to 50°. The central angle corresponding to the blind cavity is equal to 50°, and the central angle corresponding to the water injection cavity is equal to 10°. Maybe, the central angle corresponding to the working cavity is equal to the central angle corresponding to the backwashing cavity and is equal to 102°. The central angle corresponding to the regeneration cavity is equal to the central angle corresponding to the forward washing cavity and is equal to 30°. The central angle corresponding to the blind cavity is equal to 72°, and the central angle corresponding to the water injection chamber is equal to 24°.

The above are only preferred embodiments of the present invention, and are not intended to limit the present disclosure, any modification, equivalent replacement, improvement, etc. made within the spirit and principle of the present disclosure shall fall within the protection scope of the present disclosure.

Besides, it can be understood that, although the present disclosure is describe according to the embodiments, each embodiment does not include only on dependent technology solution. The description of the present disclosure is only for clarity. The person skilled in the art should regard the present disclosure as an entirety. Technology solutions in the embodiments can be adequately combined to form other embodiments that can be understood by the person skilled in the art.

What is claimed is:

1. A multifunctional softening valve, comprising:
   a valve body, a movable valve plate and a driving device, wherein a side wall of the valve body defining a water inlet, a water outlet, a drainage port, a water passing port, and a regenerant inlet;
   an inner chamber and an outer chamber located in the valve body, the inner chamber and the outer chamber being coaxial and separated from each other, the outer chamber communicated with the water inlet; the inner chamber comprising a central drainage cavity, a working cavity, a backwashing cavity, a regeneration cavity, a blind cavity, a positive washing cavity and a water injection cavity; the working cavity, the backwashing cavity, the regeneration cavity, the blind cavity, the positive washing cavity and the water injection cavity arranged in a fan ring and distributed in a circumferential direction of the central drainage cavity; wherein the central drainage cavity is communicated with the drainage port, a water blocking structure is arranged at the backwashing cavity or the water outlet, the regeneration cavity is communicated with the water passing port, the water passing port is communicated with the regenerant inlet, the water injection cavity is communicated with the regenerant inlet, a first filter element interface and a second filter element interface, coaxial with a central axis, are disposed on a bottom portion of the valve body, the working cavity and the forward washing cavity are respectively communicated with the first filter element interface, and the backwashing cavity is communicated with the second filter element interface;

wherein the movable valve plate is coaxially disposed above the inner chamber; the driving device is in transmission connection with the movable valve plate to drive the movable valve plate to rotate in the valve body; a central blind hole is defined in a central position of the movable valve plate; the movable valve plate defines a water inlet through hole, a first blind hole, a second blind hole, a third blind hole, a fourth blind hole, a fifth blind hole, a drainage blind hole, a sixth blind hole, a seventh blind hole and an eighth blind hole; the water inlet through hole the first blind hole, the second blind hole, the third blind hole, the fourth blind hole, the fifth blind hole, the drainage blind hole, the sixth blind hole, the seventh blind hole and the eighth blind hole are arranged in a fan ring and distributed in a circumferential direction of the central blind hole; the central blind hole is in communication with the central drainage cavity, and the drainage blind hole is in communication with the central blind hole; a central angle corresponding to the first blind hole is equal to a central angle corresponding to the water injection cavity; a central angle corresponding to the first blind hole plus a central angle corresponding to the second blind hole is equal to a central angle corresponding to the water inlet through hole, a central angle corresponding to the working cavity, and a central angle corresponding to the backwashing cavity respectively;

wherein a central angle corresponding to the third blind hole is equal to a central angle corresponding to the fifth blind hole, a central angle corresponding to the sixth blind hole, a central angle corresponding to the eighth blind hole, and a central angle corresponding to the water injection cavity; a central angle corresponding to the fourth blind hole is equal to a central angle corresponding to the seventh blind hole; the central angle corresponding to the third blind hole plus the central angle corresponding to the fourth blind hole is equal to a central angle corresponding to the regeneration cavity, and is equal to a central angle corresponding to the positive washing cavity; a central angle corresponding to the drainage blind hole plus a central angle corresponding to the fifth blind hole is equal to a central angle corresponding to the blind cavity.

2. The multifunctional softening valve according to claim 1, wherein the water blocking structure is a separating beam disposed in the backwashing cavity; the backwash chamber is divided into a first separating cavity and a second separating cavity by the separating beam; the first separating cavity is in communication with the water outlet, the second partition cavity is in communication with the second filter element interface; a blind plate ring adapted to the first separating cavity is disposed at the water inlet through hole of the movable valve plate; a first spacer beam, adapted to a top portion of separating beam, is disposed in the third blind hole, the fourth blind hole, the fifth blind hole, the drainage blind hole, the sixth blind hole, the seventh blind hole, and the eighth blind hole.

3. The multifunctional softening valve according to claim 2, wherein the multifunctional softening valve comprises a first fixed valve plate; the first fixed valve plate is coaxially fixed on a top end surface of the inner chamber; the movable valve plate is located above the first valve plate and is rotatably and hermetically fit with the first fixed valve plate; a center of the first fixed valve plate defines a first central through hole; the first through hole, the second through hole, the third through hole, the first blind plate, the fourth through hole, and the fifth through hole are defined in the first fixed valve plate and distributed in a circumferential direction of the first central through hole; the first blind plate comprises a protruding edge; the first central through hole is in communication with the central drainage cavity; the first through hole is in communication with the working cavity and the first filter element interface; a second spacer beam is disposed in the second through hole and the second through hole is divided into a first through opening and a second opening by the second space beam; the first through opening is in communication with the first separating cavity and the water outlet; the second through hole is in communication with the second separating cavity and the second filter element interface; the third through hole is in communication with the regeneration cavity and the water passing port; the first blind plate and the blind cavity are correspondingly arranged up and down; the fourth through hole is in communication with the forward washing cavity and the first filter element interface; and the fifth through hole is in communication with the water injection cavity and the regenerant inlet.

4. The multifunctional softening valve according to claim 3, wherein the central angle corresponding to the working cavity is the same as a central angle corresponding to the first through hole, a horizontal cross-sectional area of the working cavity is the same as a horizontal cross-sectional area of the first through hole; a central angle corresponding to the first separating cavity, a central angle corresponding to the first through opening, and a central angle corresponding to the blind plate ring are the same; a central angle corresponding to the second separating cavity, a central angle corresponding to the second through opening, and a central angle corresponding to the water inlet through hole are the same; horizontal cross-sectional areas of the second separating cavity, and the second through opening, and the water inlet through hole are the same; a central angle corresponding to the regeneration cavity is the same as a central angle corresponding to the third through hole, and a horizontal cross-sectional area of the regeneration cavity is the same as a horizontal cross-sectional area of the third through hole; the central angle corresponding to the blind cavity is the same as the central angle corresponding to the blind plate, and a horizontal cross-sectional area of the blind cavity is the same as a horizontal cross-sectional area of the blind plate; a central angle corresponding to the forward washing cavity is the same as a central angle corresponding to the fourth through hole, and a horizontal cross-sectional area of the forward washing cavity is the same as a horizontal cross-sectional area of the fourth through hole; a central angle corresponding to the water injection cavity is the same as a central angle corresponding to the fifth through hole, and a horizontal cross-sectional area of the water injection cavity is the same as a horizontal cross-sectional area of the fifth through hole.

5. The multifunctional softening valve according to claim 1, wherein the water-blocking structure is a valve disposed at the water outlet; the multifunctional softening valve further comprises a second fixed valve plate coaxially fixed on a top end surface of the inner chamber, the movable valve plate is located above the second fixed valve plate and is rotatably and hermetically fit with the second fixed valve plate; a center of the second fixed valve plate defines a second central through hole; the second fixed valve plate has a first water passing hole, a second water passing hole, a third water passing hole, a second blind plate, a fourth water passing hole and a fifth water passing hole, arranged in a fan ring and distributed in a circumferential direction of the second central through hole; the second blind plate comprises a protruding edge; the second central through hole is in communication with the central drainage cavity; the first water passing hole is in communication with the working cavity and the first filter element interface; the second water passing hole is in communication with the backwashing cavity and the second filter element interface; the third water passing hole is in communication with the regeneration cavity and the water passing port; the second blind plate and the blind cavity are correspondingly arranged up and down; the fourth water passing hole is in communication with the forward washing cavity and the first filter element interface; and the fifth water passing hole is in communication with the water injection cavity and the regenerant inlet.

6. The multifunctional softening valve according to claim 5, wherein the central angle corresponding to the working cavity, a central angle corresponding to the first water passing hole, a central angle corresponding to the first water passing hole are the same, horizontal cross-sectional areas of the working cavity, the first water passing hole, and the first water passing hole are the same; the central angle corresponding to the backwashing cavity and a central angle corresponding to the second water passing hole are the same, and horizontal cross-sectional areas of the backwashing cavity and the second water passing hole are the same; the central angle corresponding to the regeneration cavity and a central angle corresponding to the third water passing hole are the same, and horizontal cross-sectional areas of the regeneration cavity and the third water passing hole are the same; the central angle corresponding to the blind cavity and a central angle corresponding to the second blind plate are the same, and horizontal cross-sectional areas of the blind cavity and the second blind plate are the same; the central angle corresponding to the forward washing cavity and a central angle corresponding to the fourth water passing hole are the same, and horizontal cross-sectional areas of the forward washing cavity and the fourth water passing hole are the same; the central angle corresponding to the water injection cavity and a central angle corresponding to the fifth water passing hole are the same, and horizontal cross-sectional areas of water injection cavity and the fifth water passing hole are the same.

7. The multifunctional softening valve according to claim 4, wherein the blind cavity is in communication with the water outlet, and the central drainage cavity is in communication with the blind cavity; a cavity wall of the water injection cavity defines a water injection port, and the water injection port is in communication with the regenerant inlet; the side wall of the valve body is connected to a water guiding plate; the water guiding plate has a water guiding cavity in communication with water passing port, a regenerant flow pipe in communication with the regenerant inlet, and a drainage pipe in communication with the water outlet.

8. The multifunctional softening valve according to claim 6, wherein the blind cavity is in communication with the water outlet, and the central drainage cavity is in communication with the blind cavity; a cavity wall of the water injection cavity defines a water injection port, and the water injection port is in communication with the regenerant inlet; the side wall of the valve body is connected to a water guiding plate; the water guiding plate has a water guiding cavity in communication with water passing port, a regenerant flow pipe in communication with the regenerant inlet, and a drainage pipe in communication with the water outlet.

9. The multifunctional softening valve according to claim 7, wherein the water guiding plate defines a first water guiding hole, in communication with the water passing port, and a second water guiding hole in communication with the regenerant inlet; a cover plate is disposed on the water guiding plate, the cover plate defines a water guiding groove and the first water guiding hole is communication with the second water guiding hole via the water guiding groove; the first water guiding hole, the water guiding groove, and the second water guiding hole form a water guide cavity in communication with the water port and the regenerant inlet; the regenerant flow pipe is in communication with the second water guiding hole, and a jet opening is defined in the second water guiding hole.

* * * * *